United States Patent [19]
Gibson

[11] Patent Number: 5,853,596
[45] Date of Patent: Dec. 29, 1998

[54] METHOD FOR REDUCING CHEMICAL OXYGEN DEMAND OF WATER CONTAINING ORGANIC MATERIAL EMULSIFIED BY A SURFACTANT

[75] Inventor: Michael W. Gibson, Fairfield, Ohio

[73] Assignee: Henkel Corporation, Plymouth Meeting, Pa.

[21] Appl. No.: 761,952

[22] Filed: Dec. 9, 1996

[51] Int. Cl.$^6$ .................................................. C02F 1/56
[52] U.S. Cl. .................... 210/708; 210/728; 210/732; 210/737; 210/910
[58] Field of Search .................... 210/705, 708, 210/725, 727, 728, 732, 734, 735, 736, 910, 737

[56] References Cited

U.S. PATENT DOCUMENTS

| | | | |
|---|---|---|---|
| 4,715,962 | 12/1987 | Bhattacharyya et al. | 210/708 |
| 4,961,858 | 10/1990 | Spei et al. | 210/708 |
| 5,192,448 | 3/1993 | Augustin | 210/708 |
| 5,207,922 | 5/1993 | McFarlan | 210/708 |
| 5,523,000 | 6/1996 | Falbaum et al. | 210/708 |
| 5,529,696 | 6/1996 | Tibbitts | 210/708 |

*Primary Examiner*—Peter A. Hruskoci
*Attorney, Agent, or Firm*—Ernest G. Szoke; Wayne C. Jaeschke; Daniel S. Ortiz

[57] ABSTRACT

A method for reducing the COD of water containing an emulsion of organic material in water. The emulsion contains insoluble organic material and a surfactant. The COD is reduced by mixing a cationic polymer flocculent with the water and maintaining the temperature at from 37° C. to 95° C. for a sufficient length of time for an organic phase and water with reduced COD to form.

9 Claims, No Drawings

METHOD FOR REDUCING CHEMICAL OXYGEN DEMAND OF WATER CONTAINING ORGANIC MATERIAL EMULSIFIED BY A SURFACTANT

BACKGROUND OF THE INVENTION

Operations of certain processes generate waste-water effluents containing organic materials. Under current environmental regulations, before these streams can be introduced to the environment, the Chemical Oxygen Demand (hereinafter COD) must be reduced to a level permitted by environmental regulations. If the waste-water effluent stream is permitted to be introduced into a municipal sewage system for treatment, there is generally a surcharge assessed based on the level of COD in the effluent.

It is known that oil can be separated from waste-water by methods which include addition of cationic flocculents to the waste-water effluent. However, it has been found difficult to significantly reduce the COD of waste-water effluent streams containing small amounts of water immiscible organic materials and surfactants, particularly nonionic surfactants. The surfactants emulsify the organic materials to form emulsions which are difficult to break to separate the organic material from the waste-water.

Waste-water effluents containing emulsions of water immiscible organic materials and surfactants can be generated in processes such as metal cleaning and degreasing operations and processes for manufacturing surfactants. The waste-water effluents from processes such as these contain emulsified hydrocarbons and other organic materials which are difficult to separate. The waste-water effluents containing the emulsified organic materials are generally subjected to extensive treatments or are assessed substantial surcharges if they are introduced into a municipal sewage system.

BRIEF SUMMARY OF THE INVENTION

According to the present invention, the COD of wastewater effluents containing emulsions of water immiscible organic material and surfactants can be substantially reduced by mixing a cationic polymer flocculent with the wastewater and maintaining the mixture at a temperature from about 37° C. to about 95° C. for a sufficient time to form an organic material containing phase and water with a reduced COD.

Preferably the temperature is maintained in a range of from about 50° C. to about 85° C.

The organic material containing phase can be easily separated from the water with reduced COD. Methods such as skimming, frothing and the like can be used to separate the organic containing phase from the water with reduced COD.

DETAILED DESCRIPTION OF THE INVENTION

The wastewaters, which can be successfully treated by the process of the invention, comprise a major amount of water and a small amount of an insoluble organic material emulsified in the water by means of a surfactant. The wastewater generally contains less than about 60,000 parts per million COD which includes the insoluble organic material, surfactants and any soluble material which contribute to the COD. The COD contributed by the soluble organic material is not substantially reduced by the process of the invention. In describing the invention, the amount of organic material in the water, whether it be a hydrocarbon, an oil-like material, a soluble organic material or a surfactant, will be measured by the COD of the water effluent.

The COD of the water was measured according to the Method 2030 Hack Company and approved by the United States Environmental Protection Agency for reporting purposes. The COD is reported as milligrams/liter.

The amount of any water-soluble organic material, which contributes to the total COD of the wastewater, is not substantially reduced by the process of the invention. The process of the invention primarily reduces the COD by reducing the presence of water-insoluble organic materials and surfactants in the water. The amount of water-insoluble material, whether it is a solid or liquid, is substantially reduced. The method of the invention is particularly effective in reducing the amount of organic materials which are emulsified in the water by the surfactant present.

The method requires that a cationic polymer flocculent material be mixed with the water containing surfactant and organic material emulsified in the water. Cationic polymeric flocculent materials generally comprise quaternary ammonium containing polymers. Commercial materials such as Betz Polymer 1192 which is strongly cationic, medium molecular weight liquid coagulant sold as a 20% active solution in water, Betz Polymer 1195 which is a strongly cationic medium molecular weight, liquid coagulant sold as a 20% active solution in water, Mitco MITFLOC® 5845L which is a solution in water comprising an aluminum salt and a high molecular-weight, high charge density polyelectrolyte (cationic), and the like have been found suitable for use in the present invention. Cationic polymeric flocculent materials are well known and a suitable material can easily be selected by one skilled in the art.

The cationic polymeric flocculating agent is mixed with the water containing the emulsified organic material and surfactant in an amount of from about 5 to about 200, preferably from about 15 to about 150, and most preferably from about 20 to about 120 parts per million by weight of the cationic polymeric flocculent. The amount of flocculent required is dependent upon the amount of organic material and surfactant emulsified in the water. The amount of cationic polymeric flocculent required can be above the range set out above for highly contaminated water. Below about 5 parts per million of cationic polymeric flocculent additive, the reduction in COD is not sufficient to be commercially useful.

Cationic polymer flocculents are well known materials and are sold for use in water treating; however, these materials have not been known to be useful for removing organic materials which are present as an emulsion in water and heating has not been required to achieve separation.

The mixture of the cationic polymeric flocculent and the water containing the emulsified organic material is maintained at a temperature of from about 37° C. to about 95° C. and preferably from about 50° C. to 85° C. for a sufficient length of time to permit a phase containing the organic material and water with reduced COD to form. The mixture is maintained at the temperature for from about ½ to about 8 hours, but in any case for a sufficient length of time to permit the phase containing the organic material to form. The length of time required to form the two phases is dependent on the amount of surfactant present, the type of organic material in the emulsion, the amount of cationic polymer flocculent used and the reduction in COD required. Heating the mixture aids in breaking the emulsion and provides an organic phase with reduced water content. The reduced water content of the organic phase provides smaller amounts of waste to be disposed of and provides a waste which can be more easily incinerated.

After the two phases have formed, the phase containing the COD causing organic material, which generally floats because of the lower density of the organic material, can be removed from the surface of the water. The water is maintained in a substantially quiescent state while the two phases form. Skimmers and gentle frothing type apparatus have been found effective for separating the organic containing phase from the water. However, frothing must be closely controlled to prevent excess foaming caused by the surfactant. The water with the reduced COD content can then be discharged such as to a municipal sewage system. The reduced COD can substantially reduce surcharges based on COD. If the water is further treated to reduce COD and other contaminants before discharge to the environment, the reduced COD makes subsequent treatment more simple and easier to carry out.

The method of the present invention is particularly useful for treating the effluent from surfactant manufacturing plants, which due to various process operations, produce a water stream contaminated with surfactants which tend to emulsify organic material mixed with the water. As is well known in the art, it is difficult to break and separate a dilute emulsion in water. The present process readily reduces the small amount of organic material emulsified in the water and the COD.

In effluents from surfactant plants, the COD is due to the presence of the surfactant being manufactured, water-immiscible precursor materials such as fatty acids, fatty alcohols, fats and oils and the like, and water-soluble materials such as glycerine, saccharides, polyoxyalkylene polyols and other water-soluble materials which are used in or produced by the process.

Although particularly useful for treating the effluents from surfactant processes, the method of the present invention can be used to reduce the COD in water in which small amounts of organic material are emulsified with a surfactant. Such water effluent streams can be derived from a cleaning operation where an article is contacted with a water-surfactant composition to clean the surface of the article from oily deposits.

The effectiveness of the method of the invention will be shown in relation to reducing COD in a water effluent stream from a nonionic surfactant process. The COD is reported as milligrams per liter.

The COD of the wastewater and the COD of the treated wastewater was determined using Method 2030 Hack Co. which comprises an oxidation in disposable preprepared reaction tubes at 150° C. for two hours of a two (2) gram sample of water followed by measurement of the absorbance at 620 nanometers by a spectrophotometer. The results are reported as milligrams COD per liter.

Examples 1–44 were carried out in the laboratory. Samples of effluent water were periodically obtained, various amounts of cationic polymer flocculent were mixed with the water and closed containers of the mixture were heated at 62°–65° C. for 1½ to 2 hours. Two phases formed. The COD of effluent water without addition of the cationic polymer flocculent but after heating for 1½ to 2 hours was measured and compared with the COD of the water phase with addition of cationic polymer flocculent after heating for 1½ to 2 hours. The effluent water was derived from a process for preparing alkyl polyglycoside by reaction of an alcohol with a saccharide. The concentration of the individual components in the effluent were not measured; only the COD of the samples was determined. The samples were taken randomly over the test period. Alkali metal hydroxide or acid was added to certain samples to determine the effect of pH of the water on reduction of COD. The results of the laboratory tests are shown in Table 1.

TABLE 1

APG WASTEWATER RESULTS

| Example | pH | Flocculent Undiluted ppm | | COD Mg/Liter | Emulsion break |
|---|---|---|---|---|---|
| | | Betz 1195 | Betz 1192 | | |
| 1 | 2.0 | 0 | 0 | 25800 | No |
| 2 | 2.0 | 40 | 0 | 1900 | Yes |
| 3 | 2.0 | 50 | 0 | 2100 | Yes |
| 4 | 2.0 | 0 | 90 | 2900 | Yes |
| 5 | 2.0 | 0 | 0 | 17500 | No |
| 6 | 2.0 | 40 | 0 | 4100 | Some |
| 7 | 2.0 | 0 | 90 | 500 | Yes |
| 8 | 3.2 | 40 | 0 | 700 | Yes |
| 9 | 2.0 | 0 | 0 | — | No |
| 10 | 2.0 | 40 | 0 | — | No |
| 11 | 2.0 | 90 | 0 | — | No |
| 12 | 6.1 | 40 | 0 | — | No |
| 13 | 2.0 | 80 | 0 | — | No |
| 14 | 2.0 | 0 | 0 | 28500 | No |
| 15 | 2.0 | 700 | 0 | 8000 | Some |
| 16 | 7.4 | 500 | 0 | 7300 | Some |
| 17 | 2.0 | 0 | 0 | — | No |
| 18 | 2.0 | 40 | 0 | — | No |
| 19 | 2.0 | 80 | 0 | — | No |
| 20 | 2.0 | 0 | 40 | — | No |
| 21 | 2.0 | 0 | 0 | 34900 | No |
| 22 | 2.0 | 500 | 0 | 1300 | Yes |
| 23 | 8.6 | 0 | 500 | 800 | Yes |
| 24 | 8.6 | 500 | 0 | 1800 | Yes |
| 25 | 8.6 | 200 | 0 | 500 | Yes |
| 26 | 8.6 | 400 | 0 | 1300 | Yes |
| 27 | 2.0 | 0 | 0 | 5700 | Some |
| 28 | 2.0 | 50 | 0 | 2000 | Yes |
| 29 | 2.0 | 0 | 100 | 1300 | Yes |
| 30 | 8.0 | 40 | 0 | 3100 | Some |
| 31 | 2.0 | 60 | 0 | 2600 | Yes |
| 32 | 2.0 | 0 | 60 | 1500 | Yes |
| 33 | 2.0 | 0 | 0 | 14000 | No |
| 34 | 2.0 | 50 | 0 | 7000 | No |
| 35 | 2.0 | 100 | 0 | 10000 | No |
| 36 | 2.0 | 0 | 100 | 10500 | No |
| 37 | 2.0 | 50 | 0 | 11000 | No |
| 38 | 2.0 | 200 | 0 | 4900 | Some |
| 39 | 2.0 | 0 | 100 | 3900 | Yes |
| 40 | 2.0 | 0 | 200 | 3000 | Yes |
| 41 | 2.0 | 0 | 0 | 18300 | — |
| 42 | 2.0 | 50 | 0 | 4200 | — |
| 43 | 2.0 | 100 | 0 | 1700 | — |
| 44 | 2.0 | 0 | 100 | 800 | — |

The results of the laboratory tests clearly show that the method of the invention is particularly effective in reducing the COD of effluent water containing water-insoluble organic material emulsified with a surfactant. Heating the effluent water without the addition of the cationic polymer flocculent does not provide a water phase with as low COD as is obtained by the addition of cationic polymer flocculent with heating.

EXAMPLE 45

A continuous test was carried out in which water mixed with the cationic polymer flocculent was heated and maintained at a temperature of between 60° C. to 68.3° C. for about 4 hours in a separation zone. The COD of the water before addition of the flocculent and the water effluent leaving the separation zone were measured periodically over a 31-hour period. The results of the continuous test are shown in TABLE 2 using MITFLOC™ 5845L. The cationic polymer flocculent MITFLOC™ 5845L was mixed with the effluent entering the separation zone at a rate to provide 243 ppm MITFLOC™ 5845L in the effluent stream entering the separation zone.

TABLE 2

| Time Hours | Average* Temperature °C. | INLET COD mg/l. | pH | OUTLET COD mg/l. | pH |
|---|---|---|---|---|---|
| 0 | 52.2 | 18984 | 10.45 | 11534 | 9.15 |
| 7.75 | 52.2 | 8360 | 9.6 | 3762 | — |
| 23.75 | 52 | 23306 | 10.36 | 2704 | 9.16 |
| 31.25 | 53.7 | 36312 | 4.63 | 16169 | 7.65 |

*The average temperature of the water entering and the temperature of the water leaving the separation zone.

The results of the continuous operation show that the method of the invention can be used to treat an effluent stream continuously to effectively reduce the COD of the effluent.

As can be seen, the process of the invention is effective in reducing the COD of effluent water whether it is operated continuously or batchwise. The effectiveness of the continuous process can be improved with a gentle flotation with air.

We claim:

1. A method for reducing the COD of water contaminated with an emulsion of water-insoluble organic material and a surfactant, wherein the contaminated water comprises the effluent from a process for producing surfactants, which comprises: adding to the water from about 5 to about 200 parts per million by weight of a cationic polymer flocculent and maintaining the water at a temperature of from about 37° C. to about 95° C. to form an organic material containing phase and water with reduced COD.

2. The method of claim 1 wherein the temperature is from about 50° C. to about 85° C.

3. The method of claim 2 wherein the surfactant comprises a nonionic surfactant.

4. The method of claim 1 wherein the flocculent is added in an amount to provide from about 15 to about 150 ppm by weight of the polymer flocculent.

5. The method of claim 4 wherein from about 20 to about 120 ppm by weight of the polymer flocculent is added.

6. The method of claim 1 wherein the surfactant comprises a nonionic surfactant.

7. The method of claim 1 wherein the contaminated water comprises the effluent from a process for producing nonionic surfactants.

8. The method of claim 7 wherein the process for producing nonionic surfactants is a process for producing an alkyl polyglycoside surfactant.

9. The method of claim 8 wherein from about 20 to about 120 ppm of polymer flocculent are added to the water and the water is maintained at a temperature of from about 50° C. to about 85° C.

* * * * *